(12) United States Patent
Kjellman

(10) Patent No.: US 11,835,408 B2
(45) Date of Patent: Dec. 5, 2023

(54) PRESSURE GAUGES, PRESSURE VESSEL ASSEMBLIES, AND METHODS OF DISPLAYING PRESSURE WITHIN PRESSURE VESSEL ASSEMBLIES

(71) Applicant: Carrier Corporation, Palm Beach Gardens, FL (US)

(72) Inventor: Thomas Carl Kjellman, Uxbridge, MA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/734,861

(22) PCT Filed: Aug. 24, 2020

(86) PCT No.: PCT/US2020/047608
§ 371 (c)(1),
(2) Date: Dec. 3, 2020

(87) PCT Pub. No.: WO2021/041302
PCT Pub. Date: Mar. 4, 2021

(65) Prior Publication Data
US 2022/0187151 A1   Jun. 16, 2022

Related U.S. Application Data

(60) Provisional application No. 62/892,816, filed on Aug. 28, 2019.

(51) Int. Cl.
*G01L 19/04* (2006.01)
*G01L 7/04* (2006.01)

(52) U.S. Cl.
CPC .............. *G01L 19/04* (2013.01); *G01L 7/041* (2013.01); *G01L 7/043* (2013.01); *G01L 7/045* (2013.01); *G01L 7/048* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS

| 3,934,479 | A | | 1/1976 | Posnansky | |
|---|---|---|---|---|---|
| 4,143,545 | A | * | 3/1979 | Sitabkhan | ............... B60C 23/02 137/227 |

(Continued)

FOREIGN PATENT DOCUMENTS

GB    24370 A    4/1910

OTHER PUBLICATIONS

International Search Report and Written Opinion for Application No. PCT/US2020/047608; dated Nov. 25, 2020; 11 Pages.

*Primary Examiner* — Andre J Allen
(74) *Attorney, Agent, or Firm* — CANTOR COLBURN LLP

(57) ABSTRACT

A pressure gauge includes a housing, a helical tube, and a compensation member. The housing has an inlet. The helical tube is arranged within the housing and has a closed end and an open end, the open end of the helical tube in fluid communication with the inlet. The compensation member is arranged between the between the open end and the closed end of the helical tube, the compensation member fixed to the helical tube. The compensation member and the helical tube are formed from materials having different coefficients of thermal expansion to limit movement of the closed end of the helical tube due to temperature change of a compressed fluid in fluid communication with the helical tube. Pressure vessel assemblies and methods of displaying pressure in pressure vessels are also described.

20 Claims, 6 Drawing Sheets

(58) Field of Classification Search
CPC ............... G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/143; G01L 19/14; G01L 17/00; G01L 7/18; G01L 15/00; G01L 19/0092; G01L 9/0051; G01L 7/041; G01L 9/065; G01L 9/12; G01L 19/0618; G01L 9/0052; G01L 7/16; G01L 9/125; G01L 19/0609; G01L 9/007; G01L 19/003; G01L 19/0627; G01L 9/0022; G01L 19/0046; G01L 7/084; G01L 9/06; G01L 19/0636; G01L 13/02; G01L 19/0023; G01L 19/142; G01L 7/043; G01L 19/08; G01L 9/0002; G01L 9/008; G01L 19/02; G01L 19/141; G01L 9/006; G01L 11/02; G01L 23/18; G01L 23/10; G01L 19/0672; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 9/16; G01L 11/00; G01L 27/007; G01L 27/002; G01L 9/0026; G01L 19/00; G01L 9/0089; G01L 9/045; G01L 9/14; G01L 1/2281; G01L 11/025; G01L 11/008; G01L 19/0654; G01L 7/22; G01L 9/0047; G01L 13/026; G01L 9/0076; G01L 9/0025; G01L 9/0035; G01L 13/00; G01L 19/0061; G01L 9/0005; G01L 9/10; G01L 9/0019; G01L 9/08; G01L 11/006; G01L 21/00; G01L 7/08; G01L 9/04; G01L 9/0041; G01L 9/0008; G01L 11/004; G01L 9/0057; G01L 19/086; G01L 19/083; G01L 1/18; G01L 19/069; G01L 19/10; G01L 19/16; G01L 13/023; G01L 7/048; G01L 9/0016; G01L 9/0027; G01L 9/0086; G01L 9/00; G01L 9/0079; G01L 11/04; G01L 9/0048; G01L 9/0091; G01L 19/06; G01L 23/24; G01L 7/182; G01L 11/002; G01L 19/0663; G01L 7/166; G01L 1/20; G01L 23/22; G01L 27/00; G01L 9/0036; G01L 1/02; G01L 9/0061; G01L 9/0039; G01L 23/125; G01L 9/0013; G01L 9/0092; G01L 21/04; G01L 7/104; G01L 9/0045; G01L 19/145; G01L 9/0033; G01L 9/0083; G01L 9/0098; G01L 1/142; G01L 7/24; G01L 1/2293; G01L 9/0029; G01L 9/02; G01L 21/22; G01L 7/022; G01L 9/0064; G01L 23/08; G01L 23/16; G01L 5/14; G01L 7/088; G01L 7/163; G01L 9/0007; G01L 1/205; G01L 23/222; G01L 9/0085; G01L 1/16; G01L 1/2212; G01L 1/2287; G01L 13/06; G01L 9/0004; G01L 21/14; G01L 23/02; G01L 9/003; G01L 9/025; G01L 9/085; G01L 1/14; G01L 1/148; G01L 9/0058; G01L 9/105; G01L 7/061; G01L 9/002; G01L 7/02; G01L 13/028; G01L 1/2231; G01L 23/28; G01L 9/0095; G01L 1/162; G01L 7/12; G01L 9/0032; G01L 9/0038; G01L 19/0076; G01L 7/024; G01L 21/10; G01L 1/246; G01L 19/149; G01L 7/086; G01L 1/005; G01L 7/06; G01L 7/102; G01L 1/2206; G01L 13/021; G01L 27/02; G01L 5/228; G01L 1/2262; G01L 23/00; G01L 9/0094; G01L 1/24; G01L 9/0082; G01L 1/125; G01L 1/26; G01L 11/06; G01L 9/0097; G01L 1/2268; G01L 21/30; G01L 21/34; G01L 23/221; G01L 7/20; G01L 19/144; G01L 23/26; G01L 7/068; G01L 1/225; G01L 23/32; G01L 7/14; G01L 7/187; G01L 1/144; G01L 1/165; G01L 23/12; G01L 1/146; G01L 1/241; G01L 7/045; G01L 1/086; G01L 7/108; G01L 9/18; G01L 13/04; G01L 17/005; G01L 5/18; G01L 1/127; G01L 1/22; G01L 1/245; G01L 21/32; G01L 1/183; G01L 1/2218; G01L 9/0023; G01L 1/243; G01L 23/145; G01L 5/0047; G01L 9/0088; G01L 1/106; G01L 5/0076; G01L 1/10; G01L 1/186; G01L 23/223; G01L 25/00; G01L 5/165; G01L 9/001; G01L 9/0017; G01L 1/044; G01L 3/245; G01L 5/226; G01L 1/08; G01L 21/16; G01L 3/1485; G01L 5/162; G01L 5/225; G01L 7/026; G01L 7/065; G01L 9/0014; G01L 1/242; G01L 21/24; G01L 3/10; G01L 5/0004; G01L 5/0052; G01L 9/005; G01L 1/00; G01L 1/04; G01L 1/103; G01L 1/2275; G01L 1/247; G01L 21/02; G01L 21/26; G01L 23/225; G01L 3/102; G01L 3/105; G01L 5/0038; G01L 5/223; G01L 5/24; G01L 7/028; G01L 7/10; G01L 9/0011; G01L 5/243; G01L 1/083; G01L 1/12; G01L 21/36; G01L 23/04; G01L 23/14; G01L 23/30; G01L 3/103; G01L 5/00; G01L 5/0028; G01L 5/102; G01L 5/133; G01L 5/166; G01L 7/185; G01L 1/255; G01L 21/08; G01L 5/0033; G01L 5/0057; G01L 5/161; G01L 1/042; G01L 1/122; G01L 1/2225; G01L 1/2243; G01L 1/2256; G01L 1/248; G01L 2009/0066; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106
USPC .................................................. 73/700–756
See application file for complete search history.

(56) References Cited

U.S. PATENT DOCUMENTS

| 4,682,501 A * | 7/1987 | Walker .................... G01L 7/048 73/714 |
|---|---|---|
| 2017/0167935 A1 | 6/2017 | Bond et al. |
| 2021/0108982 A1 * | 4/2021 | Bond ........................ G01L 7/04 |

* cited by examiner

PRESSURE GAUGES, PRESSURE VESSEL ASSEMBLIES, AND METHODS OF DISPLAYING PRESSURE WITHIN PRESSURE VESSEL ASSEMBLIES

CROSS REFERENCE TO RELATED APPLICATIONS

This application is a National Stage of International Application Ser. No. PCT/US2020/047608, filed Aug. 24, 2020, which claims the benefit of U.S. Provisional Application No. 62/892,816, filed on Aug. 28, 2019, which is incorporated herein by reference in its entirety herein.

BACKGROUND

The present disclosure relates generally to measuring fluid pressure, and more particularly to measuring expellant pressure in fire suppression cylinders.

Pressure gauges, such as inspection pressure gauges in fire suppression cylinders, are commonly used to indicate the pressure of fluids contained within pressure vessels. Such pressure gauges generally include a mechanical element coupling the pressurized fluid with a needle. Typically, when the mass of expellant within the fire suppression cylinder is sufficient to discharge suppressant contained within the fire suppression cylinder, the pressure of the expellant drives the needle to a location within the pressure gauge indicating that the fire suppression cylinder is ready for use. When the mass of expellant within the fire suppression cylinder is insufficient for use, such as when the fire suppression cylinder has been previously discharged or the fire suppression cylinder has leaked, the needle typically inhabits a location within the pressure gauge indicative that the fire suppression cylinder is not ready for use.

One challenge to using a pressure gauge to indicate readiness of a fire suppression cylinder is the effect of temperature on the expellant contained within the fire suppression cylinder. Specifically, because temperature of the expellant contained within the fire suppression cylinder can alter the expellant pressure, some pressure gauges can indicate low pressure when the fire suppression cylinder has neither leaked nor been discharged. To avoid unnecessary replacement or recharge due to temperature-induced pressure changes, technicians typically correct the displayed pressure for the ambient temperature when inspecting such cylinders; however, this introduces the risk that additional human error may be introduced into the inspection of fire suppression agent cylinders.

Such systems and methods have generally been suitable for their intended purpose. However, there remains a need in the art for improved pressure gauges for fire suppression cylinders, and methods of measuring expellant pressure in fire suppression cylinders.

BRIEF DESCRIPTION

A pressure gauge is provided. The pressure gauge includes a housing having an inlet, a helical tube arranged within the housing with a closed end and an open end, the open end of the helical tube in fluid communication with the inlet, and a compensation member. The compensation member is arranged between the between the open end and the closed end of the helical tube, the compensation member fixed to the helical tube. The compensation member and the helical tube are formed from materials having different coefficients of thermal expansion to limit movement of the closed end of the helical tube due to temperature change of a compressed fluid in fluid communication with the helical tube.

In addition to one or more of the features described above, or as an alternative, further embodiments of the pressure gauge may include that the compensation member is directly connected to the helical tube.

In addition to one or more of the features described above, or as an alternative, further embodiments of the pressure gauge may include that the compensation member is indirectly connected to the helical tube.

In addition to one or more of the features described above, or as an alternative, further embodiments of the pressure gauge may include that the compensation member is connected along an entirety of the helical tube.

In addition to one or more of the features described above, or as an alternative, further embodiments of the pressure gauge may include that the compensation member is connected along only a portion of the helical tube.

In addition to one or more of the features described above, or as an alternative, further embodiments of the pressure gauge may include that the portion is at a location proximate the open end of the helical tube.

In addition to one or more of the features described above, or as an alternative, further embodiments of the pressure gauge may include that the portion is at a location proximate the closed end on the helical tube.

In addition to one or more of the features described above, or as an alternative, further embodiments of the pressure gauge may include that the helical tube thermally couples the compensation member to the compressed fluid.

In addition to one or more of the features described above, or as an alternative, further embodiments of the pressure gauge may include a compressed fluid including an expellant impounded within the helical tube.

In addition to one or more of the features described above, or as an alternative, further embodiments of the pressure gauge may include that the open end of the helical tube is fixed relative to the housing, and that the free of the of the helical tube is free relative to the housing, and wherein the helical tube has an oblong profile In addition to one or more of the features described above, or as an alternative, further embodiments of the pressure gauge may include that the helical tube is formed from a helical tube material, wherein the compensation member includes a compensation member material, and wherein the compensation member material is different from the helical tube material.

In addition to one or more of the features described above, or as an alternative, further embodiments of the pressure gauge may include that the compensation member is a beam.

In addition to one or more of the features described above, or as an alternative, further embodiments of the pressure gauge may include that the compensation member is a bimetallic beam.

In addition to one or more of the features described above, or as an alternative, further embodiments of the pressure gauge may include a pointer fixed relative to the closed end of the helical tube, a scale underlying the pointer, and a window seated in the housing and overlying the pointer. The scale has an under-pressure segment coupled to an over-pressure segment by a ready segment.

In addition to one or more of the features described above, or as an alternative, further embodiments of the pressure gauge may include that the helical tube is a bourdon tube.

In addition to one or more of the features described above, or as an alternative, further embodiments of the pressure gauge may include that the helical tube and compensation member define a bimetallic beam, and that a compressed fluid including an expellant is impounded within the bimetallic beam.

A pressure vessel assembly is also provided. The pressure vessel assembly includes a pressure vessel defining a chamber and having a boss and a pressure gauge as described above seated in the boss and in fluid communication therethrough with the chamber of the pressure vessel. A compressed fluid including an expellant and a fire suppression material is contained with the chamber of the pressure vessel, a portion of the compressed fluid impounded within the helical tube.

In addition to one or more of the features described above, or as an alternative, further embodiments of the pressure vessel assembly may include a pointer fixed relative to the closed end of the helical tube, a scale underlying the pointer, and a window seated in the housing and overlying the pointer. The scale has an under-pressure segment coupled to an over-pressure segment by a ready segment. The pointer remains fixed relative to the scale over a temperature range of between about between about −40 degrees Celsius (about −40 degrees Fahrenheit) and about 55 degrees Celsius (about 131 degrees Fahrenheit).

A method of displaying pressure within a pressure vessel is additionally provided. The method includes, at a pressure gauge as described above, changing temperature of a compressed fluid in thermal communication with the helical tube and expanding or contracting one of the helical tube and the compensation member at a first rate corresponding to the temperature change. The other of the helical tube and the compensation member is expanded or contracted at a second rate corresponding to the temperature change, and movement of the closed end of the helical limited with expansion or contraction of the compensation member.

In addition to one or more of the features described above, or as an alternative, further embodiments of the method may include limiting movement of the closed end of the tube includes preventing substantially all movement of the closed end over temperature range of about between about between about −40 degrees Celsius (about −40 degrees Fahrenheit) and about 55 degrees Celsius (about 131 degrees Fahrenheit).

A method of making a pressure gauge is also provided. The method includes defining a housing having an inlet, arranging a helical tube within the housing with a closed end and an open end such that the open end of the helical tube in fluid communication with the inlet, and arranging a compensation member arranged between the between the open end and the closed end of the helical tube such that the compensation member fixed to the helical tube. The compensation member and the helical tube are formed from materials having different coefficients of thermal expansion to limit movement of the closed end of the helical tube due to temperature change of a compressed fluid in fluid communication with the helical tube.

Technical effects of the present disclosure include compensation for temperature change differences in pressure of fluids contained within the pressure vessels. Technical effects also include limiting (or eliminating entirely) the need to manually compensate pressure displayed by a pressure gauge for ambient temperature of the fluid being measured by the pressure gauge.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
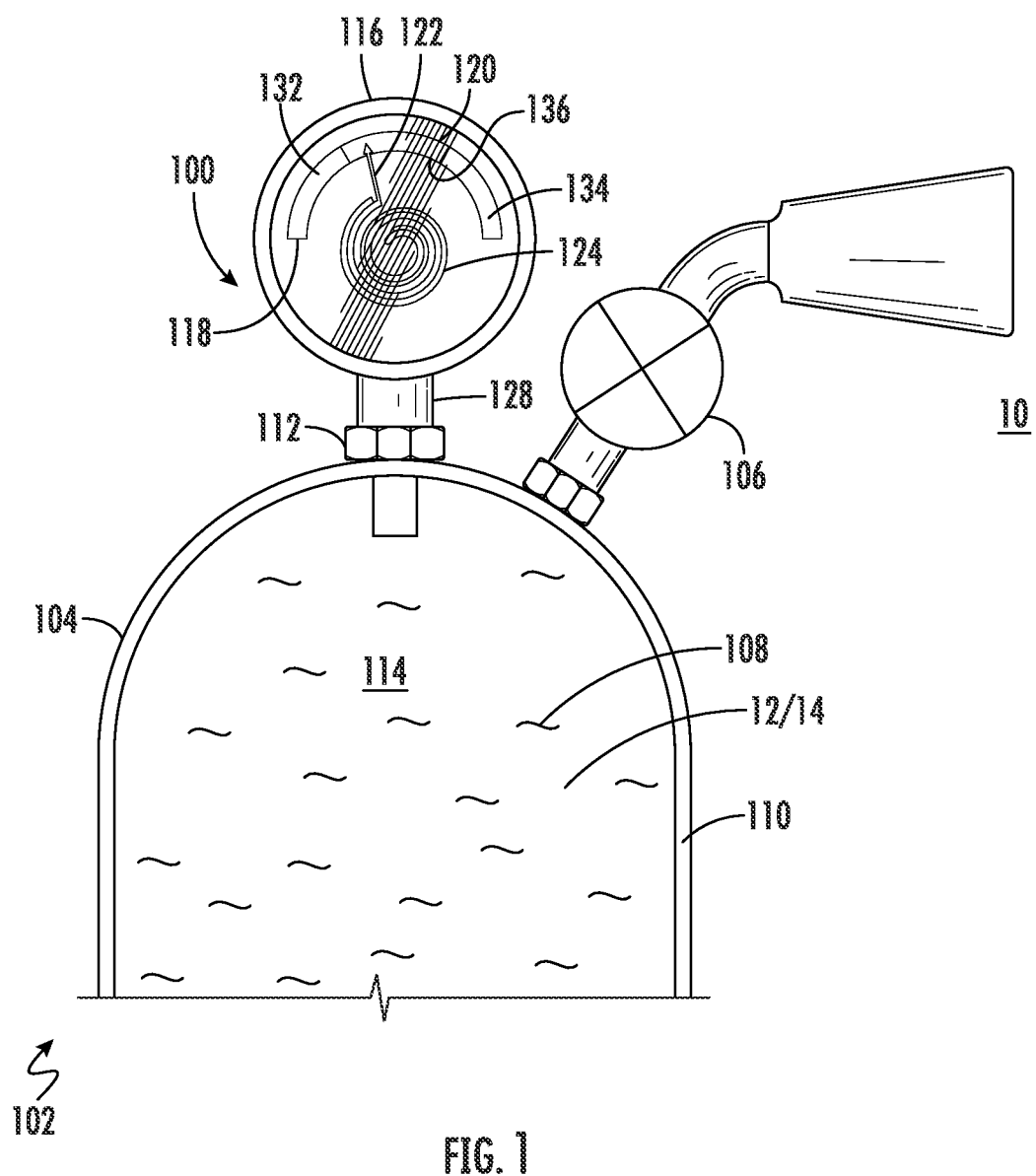
FIG. 1 is a schematic view of a pressure vessel assembly constructed in accordance with the present disclosure, showing a fire extinguisher assembly having a pressure gauge with a compensation member for monitoring pressure of an expellant disposed within the pressure vessel.

Reference will now be made to the drawings wherein like reference numerals identify similar structural features or aspects of the subject disclosure. For purposes of explanation and illustration, and not limitation, a partial view of an exemplary embodiment of a pressure gauge constructed in accordance with the disclosure is shown in FIG. 1 and is designated generally by reference character 100. Other embodiments of pressure gauges, pressure vessel assemblies, and methods of displaying pressure within pressure vessel assemblies in accordance with the present disclosure, or aspects thereof, are provided in FIGS. 2-6, as will be described. The systems and methods described herein can be used for displaying temperature-compensated pressure within pressure vessels, such as in pressure gauges employed on fire suppression cylinders for leak detection, though the present disclosure is not limited to leak detection or to fire suppression cylinders in general.

Referring to FIG. 1, a pressure vessel assembly 102, e.g., a fire suppression cylinder, is shown. The pressure vessel assembly 102 includes the pressure gauge 100, a pressure vessel 104, a discharge valve 106, and a compressed fluid 108. The pressure vessel 104 has a wall 110 and a boss 112. The wall 110 defines a chamber 114 within the pressure vessel 104. The compressed fluid 108 is disposed within the chamber 114 and the discharge valve 106 is in fluid communication with the chamber 114 for selective coupling of the chamber 114 with the external environment 10. The selective coupling of the chamber 114 to the discharge valve 106 allows for issue of the compressed fluid 108 therethrough to the external environment 10 upon actuation of the discharge valve 106. In certain embodiments the compressed fluid 108 includes an expellant 12 and a fire suppression material 14.

The pressure gauge 100 is seated on the boss 112 and is in fluid communication therethrough with the compressed fluid 108. In this respect the pressure gauge 100 includes a housing 116, a window 118, and a scale 120. The pressure gauge 100 also includes a pointer 122, a helical tube 124, a compensation member 126 (shown in FIG. 3), and an inlet conduit 128.

Figure 2:
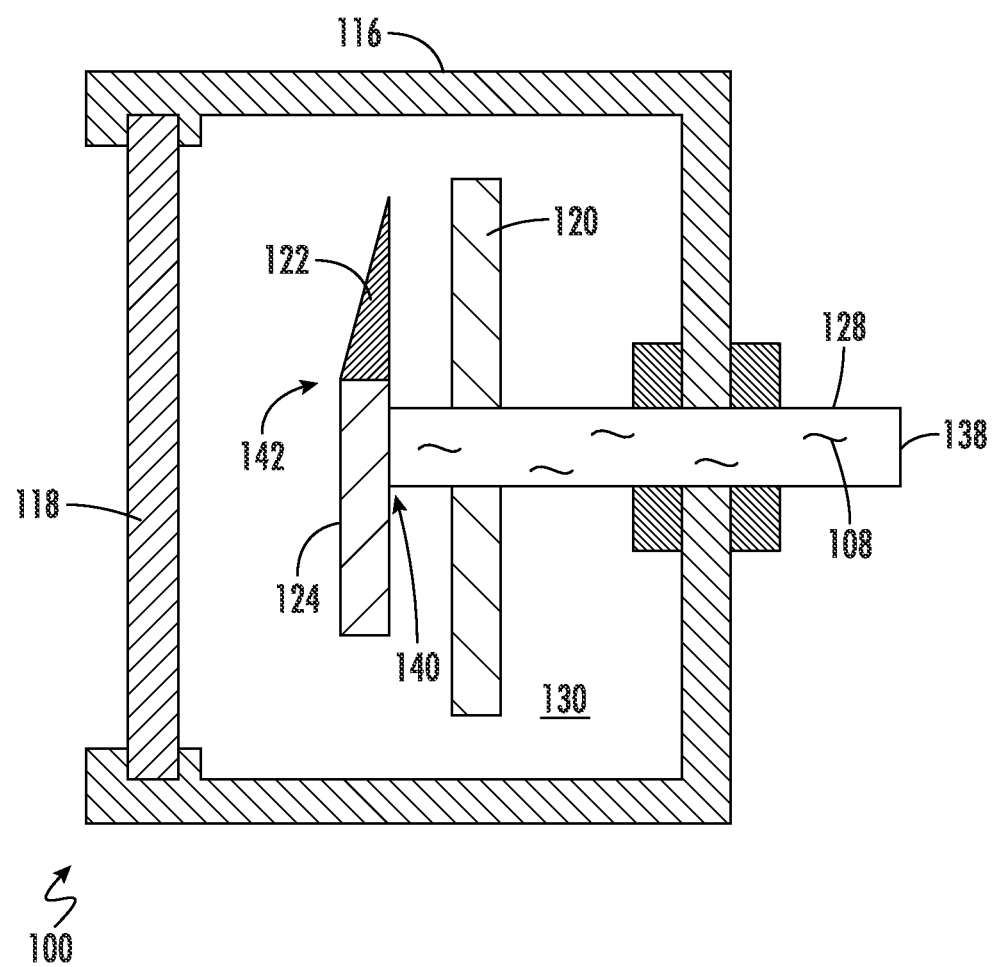
FIG. 2 is a cross-sectional side view of the pressure gauge of FIG. 1, showing a pointer operably connected to the expellant by a bourdon tube and the compensation member.

The housing 116 has an interior 130 (shown in FIG. 2). The window 118 is seated in the housing 116 and is formed from a transparent material, such as glass or plastic. The scale 120 is supported within the housing 116 and is fixed relative to the housing 116. The pointer 122 is movably supported within the interior 130 of the housing 116 and is registered to the scale 120 according to pressure of the compressed fluid 108. As shown in FIG. 1, the scale 120 has an under-pressure segment 132 coupled to an over-pressure segment 134 by a ready segment 136. As will be appreciated by those of skill in the art in view of the present disclosure, pressure gauges having other types of scales can also benefit from the present disclosure, such as pressure gauges having graduated scales and colored indicators by way of non-limiting example.

With reference to FIG. 2, the pressure gauge 100 is shown. The housing 116 has an inlet 138 defined by the inlet conduit 128. The inlet 138 is in fluid communication with the chamber 114 (show in FIG. 1) for communication of pressure of the compressed fluid 108, and in certain embodiments the compressed fluid 108, to the pressure gauge 100. The inlet conduit 128 in turn extends into the interior 130 of the housing 116 and is in fluid communication with the helical tube 124.

Figure 3:
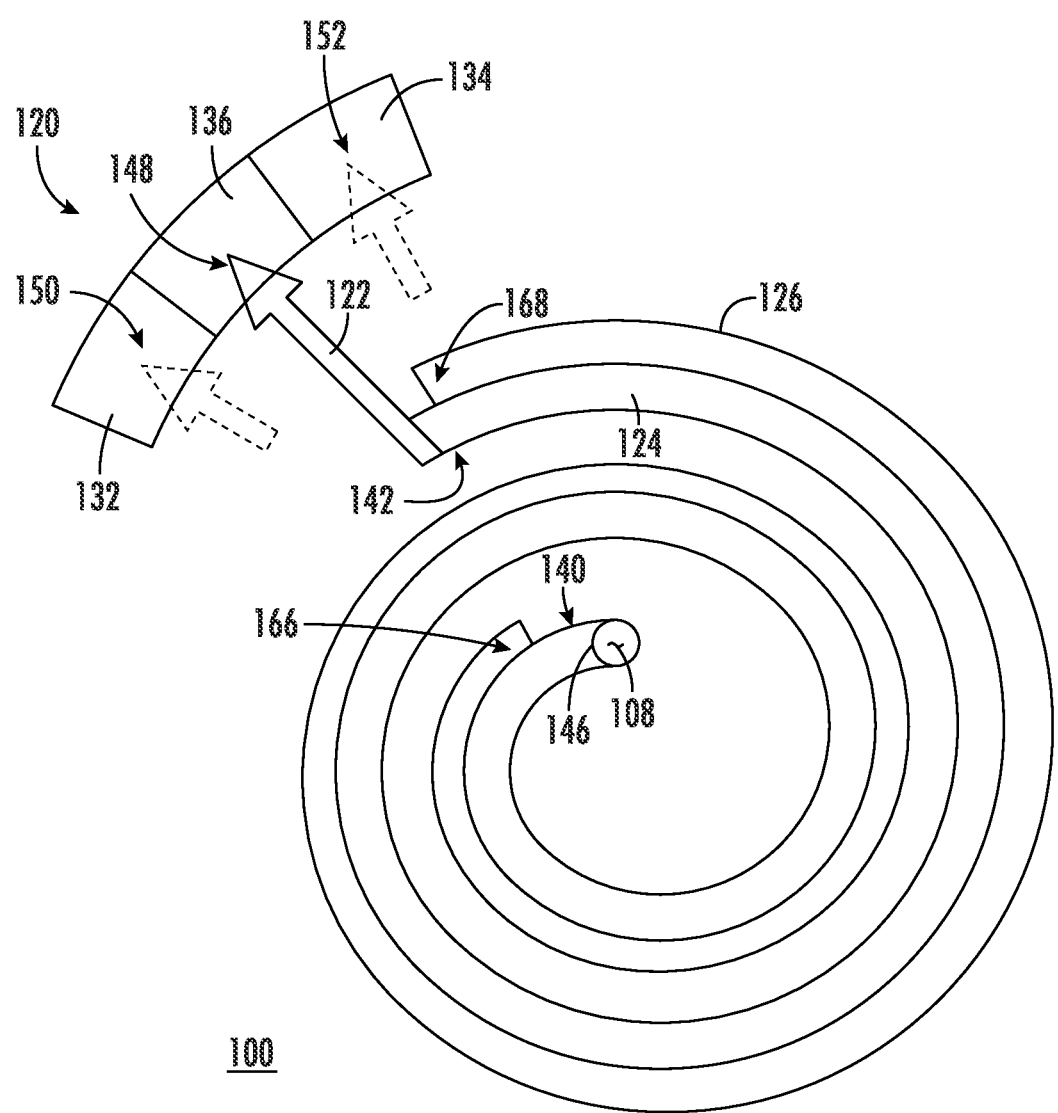
FIG. 3 is schematic view of a portion of the pressure gauge of FIG. 1, showing the bourdon tube and the compensation member cooperating to position the pointer over a scale according to pressure communicated by the expellant at a nominal temperature.
Figure 4:
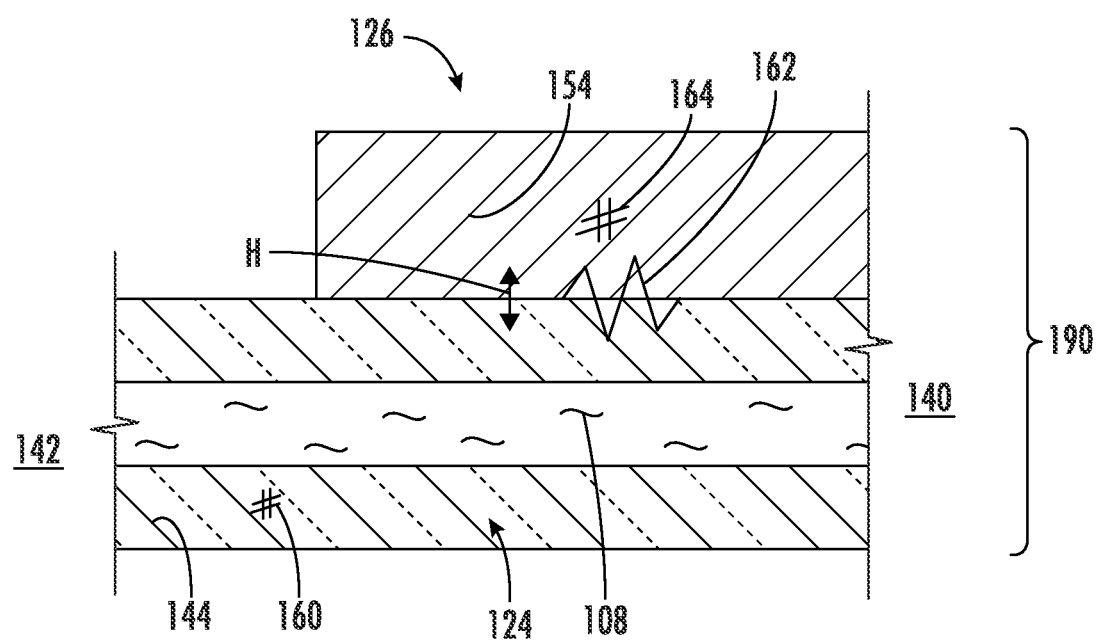
FIG. 4 is a schematic view of a portion of the pressure gauge of FIG. 1, showing a portion of the compensation member fixed to the helical tube, the helical tube exchanging heat between the compensation member and a compressed fluid impounded within the helical tube.

The helical tube 124 has an open end 140 and a closed end 142 and is formed from a helical tube material 144 (shown in FIG. 4). The open end 140 of the helical tube 124 is fixed relative to the housing 116 and is connected to the inlet conduit 128. The closed end 142 is free relative to the housing 116 and is fixed thereto the pointer 122. Between the open end 140 and the closed end 142 the helical tube 124 the helical tube 124 defines an oblong profile 146 (shown in FIG. 3). In certain embodiments the helical tube 124 can be a bourdon tube.

The pointer 122 is fixed to the closed end 142 of the helical tube 124 and is movable therewith according to pressure of the compressed fluid 108 communicated to the open end 140 of the helical tube 124. In this respect the pointer 122 is registered relative to the scale 120 according to pressure of the compressed fluid 108 communicated to the open end 140 of the helical tube 124. As shown in FIG. 2 the pointer 122 overlays the scale 120 and the window 118 overlays the pointer 122, the pointer 122 arranged between the scale 120 and the window 118.

With reference to FIG. 3, a portion of the pressure gauge 100 is shown. As will be appreciated by those skill in the art in view of the present disclosure, registration of the pointer 122 to the scale 120 generally provides an indication of the mass of the compressed fluid 108 contained within the chamber 114 (shown in FIG. 1) of the pressure vessel 104 (shown in FIG. 1). For example, the pressure gauge 100 can be configured such that the pressure of the compressed fluid 108 communicated to the helical tube 124 for a predetermined mass of the compressed fluid 108 at a predetermined nominal temperature register the pointer 122 to the ready segment 136 of the scale 120, the pressure gauge 100 thereby providing a ready-to-use indication 148.

As will also be appreciated by those of skill in the art in view of the present disclosure, pressure of the compressed fluid 108 (shown in FIG. 1) communicated to the helical tube 124 can change with temperature of the compressed fluid 108. In some pressure vessel assemblies such temperature-induced pressure change can displace the pointer 122 from the ready segment 136 of the scale 120. For example, when sufficiently cool (relative to a nominal temperature), the pressure communicated by the compressed fluid 108 to the helical tube 124 can displace the pointer 122 such that the pointer 122 becomes registered to the under-pressure segment 132 of the scale 120—the pressure gauge 100 potentially providing an under-pressure indication 150 (shown with dashed pointer outline) that the pressure vessel assembly 102 has developed a leak and is therefore unserviceable when the pressure vessel assembly 102 is in fact ready-to-use. Oppositely, when sufficiently warm (relative to the nominal temperature), the pressure communicated to the helical tube 124 can displace the pointer 122 such that the pointer 122 becomes registered to the over-pressure segment 134 of the scale 120—the pressure gauge 100 potentially providing an over-pressure indication 152 (also shown with dashed pointer outline) that the pressure vessel assembly 102 is overcharged when the pressure vessel assembly 102 is in fact properly charged. To limit (or eliminate entirely) the presentation of the under-pressure indication 150 and the over-pressure indication 152 when the pressure vessel 104 in fact contains the proper mass of compressed fluid 108, e.g., the expellant 12 (shown in FIG. 1), the pressure gauge 100 includes the compensation member 126.

With reference to FIG. 4, portions of the helical tube 124 and the compensation member 126 are shown. The helical tube 124 impounds within its interior a portion of the compressed fluid 108 between the open end 140 (shown in FIG. 2) and the closed end 142 (shown in FIG. 2) of the helical tube 124 and is formed by the helical tube material 144. The compensation member 126 is fixed to the helical tube 124 between the open end 140 and the closed end 142 of the helical tube 124 such that the helical tube 124 thermally couples the compressed fluid 108 to the compensation member 126 and is formed from a compensation member material 154. It is contemplated that the compensation member material 154 be different than the helical tube material 144. More specifically, it is contemplated that the helical tube material 144 have a coefficient of thermal expansion 160 that is different than a coefficient of thermal expansion 164 of the compensation member material 154.

In certain embodiments the compensation member material 154 and the helical tube material 144 can both be metallic materials, the helical tube 124 and the compensation member 126 thereby defining a bimetallic beam 190 containing the compressed fluid 108. It is contemplated that the coefficient of thermal expansion 164 of the compensation member material 154 be such that compensation member 126 opposes (and in certain embodiments prevents entirely) movement of the closed end 142 (shown in FIG. 2) of the helical tube 124 due to change in temperature of the compressed fluid 108, e.g., via communication of heat H between the compensation member 126 and the compressed fluid 108 through the helical tube 124. Examples of suitable helical tube materials include stainless steel, brass, and bronze materials. Examples of suitable compensation member materials include stainless steel, brass, bronze, and/or aluminum materials differing in composition from that of the helical tube material 144.

In certain embodiments the compensation member 126 can be directly connected to the helical tube 124, such as through a deposition technique. Direct connection of the compensation member 126 to the helical tube 124 limits thermal resistance between the compressed fluid 108 and the compensation member 126, limiting delay in response of the compensation member 126 to temperature change of the helical tube 124. In accordance with certain embodiments the compensation member 126 can be indirectly connected to the helical tube 124, such as by a braze or weld 162. Indirect connection of the compensation member 126 to the helical tube 124 can simplify the manufacture of the pressure gauge 100.

With continuing reference to FIG. 3, it is contemplated that the compensation member 126 can be connected to the helical tube 124 along substantially the entirety of the helical tube 124, e.g., being conformally disposed thereon or connected thereto by the braze or weld 162 (shown in FIG. 4). Connecting the helical tube 124 along substantially the entirety of the helical tube 124 (i.e. the entire length of the helical tube) provides a relative uniform balancing to the offsetting contraction and expansion of the helical tube 124 and the compensation member 126 in response to a change of the compressed fluid 108 along the helical tube, limiting strain with the helical tube. In accordance with certain embodiments the compensation member 126 can be connected to only a portion of the helical tube 124, by the braze or weld 162 (shown in FIG. 4). For example, the compensation member 126 can be connected to the helical tube 124 at a location 166 proximate the open end 140 of the helical tube 124, the compensation member 126 exaggerating the offsetting force applied by the compensation member 126 to the helical tube 124. Alternatively, the compensation member 126 can the connected to the helical tube 124 at a location 168 proximate the closed end 142 of the helical tube 124, limiting exaggeration of the offsetting force exerted on the helical tube 124 by the compensation member 126.

Figure 5:
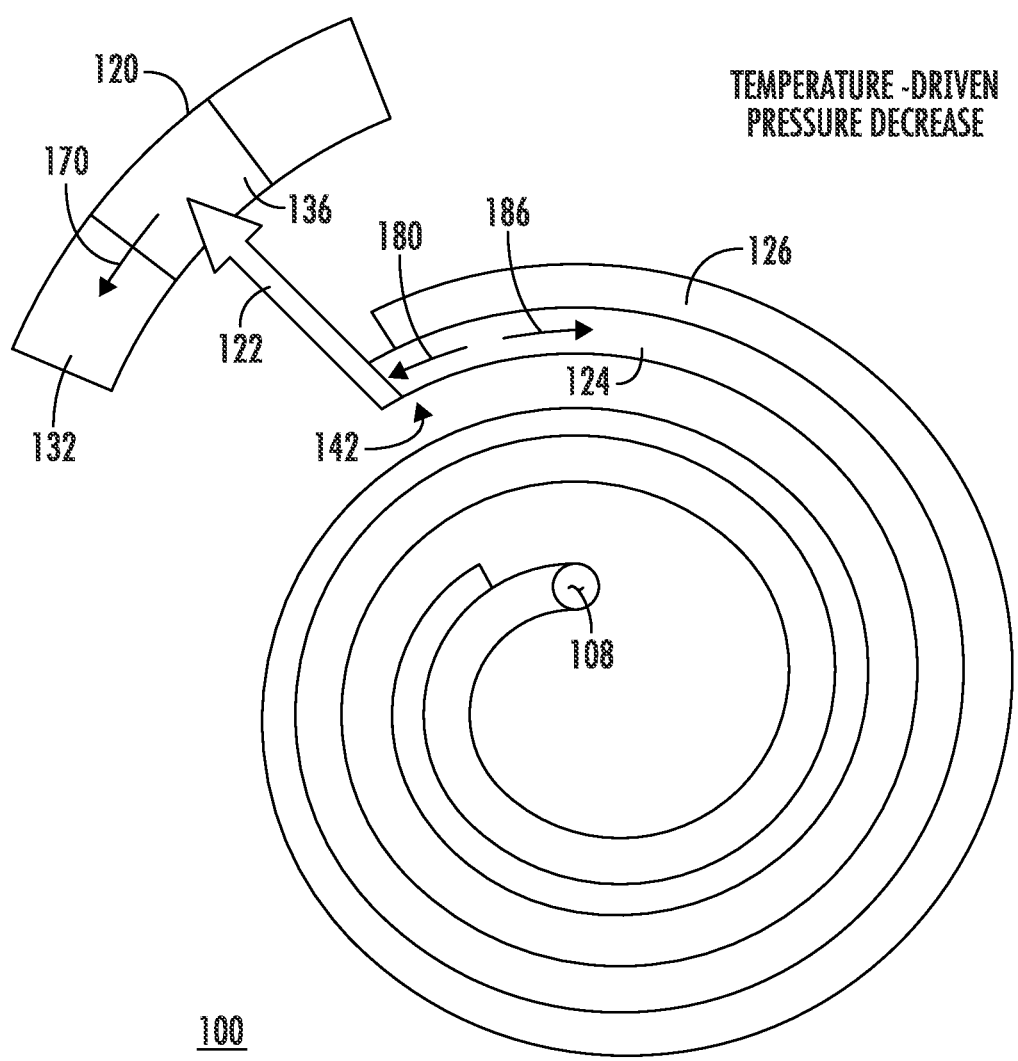
FIG. 5 is schematic view of the portion of the pressure gauge of FIG. 1, showing the bourdon tube and the compensation member cooperating to maintain position the pointer over a scale according to pressure communicated by the expellant at a temperature above the nominal temperature.
Figure 6:
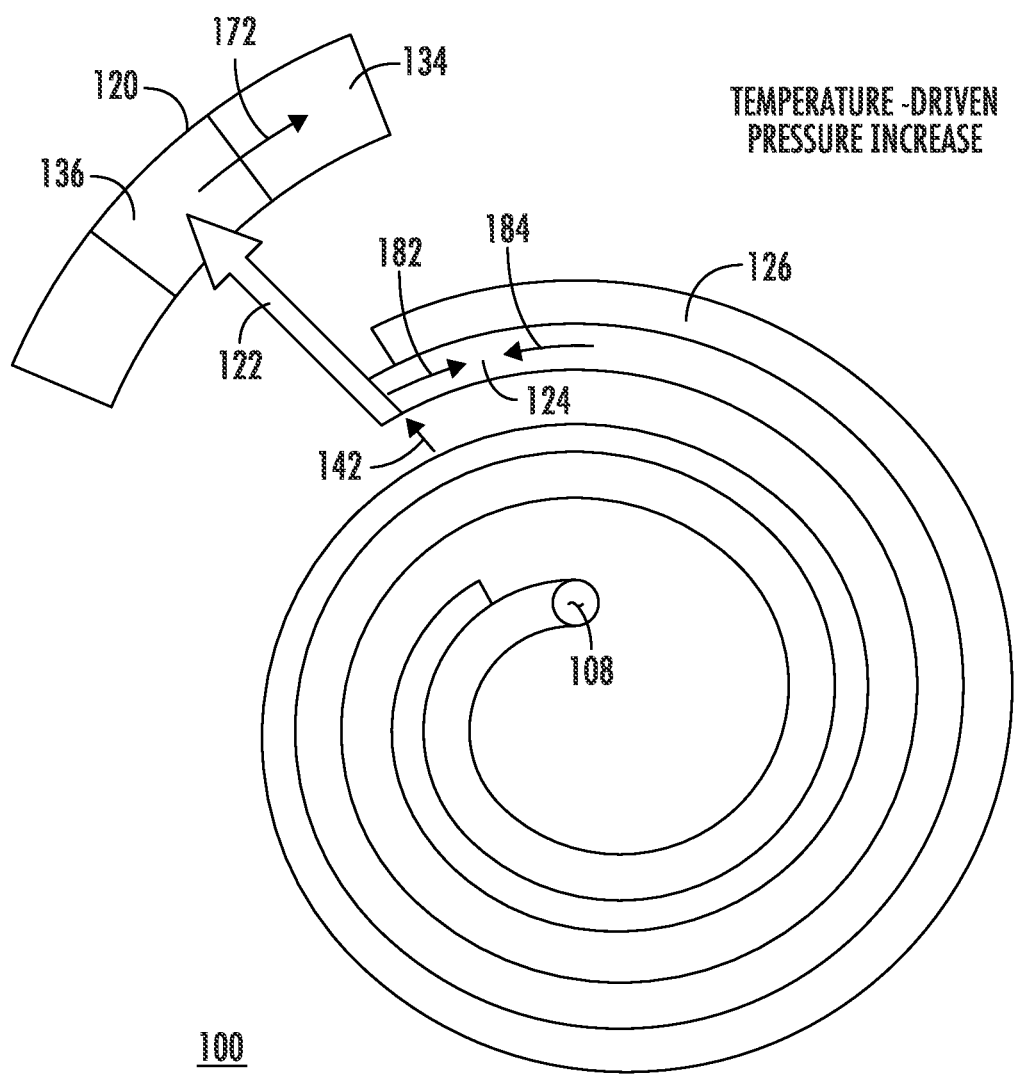
FIG. 6 is schematic view of the portion of the pressure gauge of FIG. 1, showing the bourdon tube and the compensation member cooperating to maintain position the pointer over a scale according to pressure communicated by the expellant at a temperature below the nominal temperature

With reference to FIGS. 3, 5, and 6, cooperation of the compensation member 126 and the helical tube 124 is shown. As shown in FIG. 3, once the pressure vessel 104 is charged pressure of the compressed fluid 108 is communicated to the helical tube 124 by the inlet conduit 128 (shown in FIG. 2). Since the helical tube 124 is closed on one end the pressure of the compressed fluid 108 is operative to displace the closed end 142 of the helical tube 124 according to magnitude of the pressure of the compressed fluid 108. At nominal temperature and nominal mass of the compressed fluid 108 the pressure causes the helical tube 124 to position the pointer 122 along the ready segment 136 of the scale 120.

As shown in FIG. 5, decrease in pressure of the compressed fluid 108, e.g., from a decrease in the mass of compressed fluid 108 due to actuation of the discharge valve 106 (shown in FIG. 1) or leakage from the pressure vessel 104 (shown in FIG. 1), exerts a deformation force 180 on the helical tube 124. The deformation force 180 urges the helical tube 124 to become more tightly wound according to the magnitude of the deformation force 180, diameter of the turns of the helical tube 124 tending to decrease. The resulting deformation displaces the closed end 142 of the helical tube 124, and thereby the pointer 122, toward the under-pressure segment 132 of the scale 120. At nominal temperature the pressure gauge 100 indicates the decrease in the mass of the compressed fluid 108 contained within the pressure vessel 104 with deflection 170 of the pointer 122 relative to the scale 120 in the direction of the under-pressure indication 150 (shown in FIG. 3).

When temperature decrease of the compressed fluid 108 is responsible for the pressure decrease, the compensation member 126 exerts a deformation compensation force 186 in opposition to the deformation force 180. Specifically, as temperature of the compensation member 126 and the helical tube 124 decreases the compensation member material 154 (shown in FIG. 4) forming the compensation member 126 contracts more slowly than the helical tube material 144 (shown in FIG. 4) forming the helical tube 124. The slower rate of contraction of the compensation member material 154 relative to that of the helical tube material 144 causes the compensation member 126 to exert the deformation compensation force 186 on the helical tube 124. The deformation compensation force 186 is exerted in a direction opposite that of the deformation force 180, the deformation compensation force 186 thereby limiting movement of the closed end 142 of the helical tube 124. Consequently, the pointer 122 remains in registration with the ready segment 136 of the scale 120 and does not move into registration with the under-pressure segment 132 of the scale 120, as would otherwise occur in response to the temperature decrease.

In certain embodiments the closed end 142 exhibits substantially no movement due to pressure change within the pressure vessel 104 due to temperature change within a range of about −40 degrees Celsius (about −40 degrees Fahrenheit) and about 55 degrees Celsius (about 131 degrees Fahrenheit). Absence of movement within this range can prevent temperature changes within a range commonly experienced by fire suppression cylinders from displaying a decrease in mass of the compressed fluid 108 contained within the pressure vessel 104 when, in fact, the mass of the compressed fluid 108 contained within the pressure vessel 104 (shown in FIG. 1) is unchanged.

As shown in FIG. 6, increase in pressure of the compressed fluid 108, such as due to an addition to the mass of the compressed fluid 108 contained within the pressure vessel 104 (shown in FIG. 1), exerts a deformation force 182 on the helical tube 124. The deformation force 182 urges the helical tube 124 to become less tightly wound according to the magnitude of the deformation force 182. At nominal temperature the resulting deformation of the helical tube 124 displaces 172 the closed end 142 of the helical tube 124, and thereby the pointer 122, toward the over-pressure segment 134 of the scale 120. The pressure gauge 100 thereby indicates an increase in the mass of the compressed fluid 108 contained within the pressure vessel 104 with registration of the pointer 122 along the over-pressure segment 134 of the scale 120.

When the pressure change within the pressure vessel 104 (shown in FIG. 1) is due to temperature increase of the compressed fluid 108, the compensation member 126 exerts a deformation compensation force 184 in opposition to the deformation force 182. Specifically, as temperature of the compressed fluid 108 increases, the compensation member material 154 (shown in FIG. 4) forming the compensation member 126 expands at a rate different than that of the helical tube material 144 (shown in FIG. 4) forming the helical tube 124 in response to the temperature increase. The different rates of expansion in response to the temperature increase causes the compensation member 126 to exert the deformation compensation force 184 on the helical tube 124 in a direction opposite the deformation force 182, also limiting movement of the closed end 142 of the helical tube 124. Consequently, the pointer 122 remains in registration with the ready segment 136 of the scale 120 and does not move into registration with the over-pressure segment 134 of the scale 120, as would otherwise occur due to the temperature increase.

In certain embodiments the closed end 142 exhibits substantially no movement due to pressure change within the pressure vessel 104 due to temperature change within a range of about −40 degrees Celsius (about −40 degrees Fahrenheit) and about 55 degrees Celsius (about 131 degrees Fahrenheit). As above, absence of movement within this range can prevent temperature changes within a range commonly experienced by fire suppression cylinders from displaying an increase in mass of the compressed fluid 108 contained within the pressure vessel 104 when no mass has been added to the chamber 114 (shown in FIG. 1) of the pressure vessel 104 (shown in FIG. 1).

Pressure gauges can be employed on fire suppression cylinders to provide indication of pressure within the fire suppression cylinder, such as due to actuation of the fire suppression cylinder and/or leakage from the fire suppression cylinder. In some fire suppression cylinders the pressure displayed by a pressure gauge can be influenced by factors other than actuation and/or leakage, such as pressure change due to temperature change of the fire suppression cylinder. In such event a fire suppression cylinder that is otherwise ready for use can appear to be in either an under-pressure or over-pressure condition. This can result in unnecessary service and/or replacement of the fire suppression cylinder.

In embodiments described herein pressure gauges with compensation members are employed to understate or overstate pressure reported by pressure gauges when pressure change within the fire suppression cylinder is due to change in temperature relative to a nominal temperature. In certain embodiments the compensation member is directly connected to helical tube, e.g., between an open end and a closed end of a helical tube, the compensation member and the helical tube thereby cooperating as a bimetallic beam. In accordance with certain embodiments the material forming the compensation member and the shape of the compensation member are selected such that the closed end of the helical tube does not move in response to temperature-driven temperature changes within a range of between about −40 degrees Celsius (about −40 degrees Fahrenheit) and about 55 degrees Celsius (about 131 degrees Fahrenheit), the compensation member thereby preventing temperature change a fire suppression from suggesting that the fire suppression cylinder has been overfilled, actuated and/or leaked.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pressure gauge, comprising:
   a housing having an inlet;
   a helical tube arranged within the housing with a closed end and an open end, the open end of the helical tube in fluid communication with the inlet; and
   a compensation member arranged between the open end and the closed end of the helical tube, the compensation member fixed to the helical tube,
   wherein the compensation member and the helical tube are formed from materials having different coefficients of thermal expansion to limit movement of the closed end of the helical tube due to temperature change of a compressed fluid in fluid communication with the helical tube.

2. The pressure gauge as recited in claim 1, wherein the compensation member is directly connected to the helical tube.

3. The pressure gauge as recited in claim 1, wherein the compensation member is indirectly connected to the helical tube.

4. The pressure gauge as recited in claim 1, wherein the compensation member is connected along an entirety of the helical tube.

5. The pressure gauge as recite in claim 1, wherein the compensation member is connected along only a portion of the helical tube.

6. The pressure gauge as recited in claim 5, wherein the portion is at a location proximate the open end of the helical tube.

7. The pressure gauge as recited in claim 5, wherein the portion is at a location proximate the closed end on the helical tube.

8. The pressure gauge as recited in claim 1, wherein the helical tube thermally couples the compensation member to the compressed fluid.

9. The pressure gauge as recited in claim 1, further comprising a compressed fluid including an expellant impounded within the helical tube.

10. The pressure gauge as recited in claim 1, wherein the open end of the helical tube is fixed relative to the housing, wherein the free of the of the helical tube is free relative to the housing, and wherein the helical tube has an oblong profile.

11. The pressure gauge as recited in claim 1, wherein the helical tube is formed from a helical tube material, wherein the compensation member includes a compensation member material, and wherein the compensation member material is different from the helical tube material.

12. The pressure gauge as recited in claim 1, further comprising:
    a pointer fixed relative to the closed end of the helical tube;
    a scale underlying the pointer, wherein the scale has an under-pressure segment coupled to an over-pressure segment by a ready segment; and
    a window seated in the housing and overlying the pointer.

13. The pressure gauge as recited in claim 1, wherein the compensation member is a beam.

14. The pressure gauge as recited in claim 1, wherein the compensation member is a bimetallic beam.

15. The pressure gauge as recited in claim 1, wherein the helical tube is a bourdon tube.

16. The pressure gauge as recited in claim 1, wherein the helical tube and the compensation member define a bimetallic beam, wherein a compressed fluid including an expellant is impounded within the bimetallic beam.

17. A pressure vessel assembly, comprising:
   a pressure vessel defining a chamber and having a boss;
   a pressure gauge as recited in claim 1 seated in the boss and in fluid communication therethrough with the chamber of the pressure vessel; and
   a compressed fluid including an expellant and a fire suppression material contained with the chamber of the pressure vessel, a portion of the compressed fluid impounded within the helical tube.

18. The pressure vessel as recited in claim 17, wherein the pressure gauge includes:
   a pointer fixed relative to the closed end of the helical tube;
   a scale underlying the pointer, wherein the scale has an under-pressure segment coupled to an over-pressure segment by a ready segment; and
   a window seated in the housing and overlying the pointer, wherein the pointer remains fixed relative to the scale over a temperature range of between about between about −40 degrees Celsius (about −40 degrees Fahrenheit) and about 55 degrees Celsius (about 131 degrees Fahrenheit).

19. A method of displaying pressure within a pressure vessel, comprising:
   at a pressure gauge having a housing with an inlet conduit extending into an interior of the housing, a helical tube formed from a tube material with a closed end and an open end, the open end of the helical tube connected to the inlet conduit, and a compensation member fixed to the helical tube between the open end and the closed end of the helical tube, the compensation member formed from a material having a coefficient of thermal expansion differing from that of a material forming the helical tube,
   changing temperature of a compressed fluid in thermal communication with the helical tube;
   expanding or contracting one of the helical tube and the compensation member at a first rate corresponding to the temperature change;
   expanding or contracting the other of the helical tube and the compensation member at a second rate corresponding to the temperature change; and
   limiting movement of the closed end of the helical with expansion or contraction of the compensation member.

20. A method of making a pressure gauge, comprising:
   defining a housing having an inlet;
   arranging a helical tube within the housing with a closed end and an open end, the open end of the helical tube in fluid communication with the inlet; and
   arranging a compensation member arranged between the open end and the closed end of the helical tube, the compensation member fixed to the helical tube,
   wherein the compensation member and the helical tube are formed from materials having different coefficients of thermal expansion to limit movement of the closed end of the helical tube due to temperature change of a compressed fluid in fluid communication with the helical tube.

* * * * *